United States Patent [19]

Schierling

[11] Patent Number: 4,526,260
[45] Date of Patent: Jul. 2, 1985

[54] TORQUE TRANSMISSION DEVICE

[75] Inventor: Bernhard Schierling, Unterpleichfeld, Fed. Rep. of Germany

[73] Assignee: Fichtel & Sachs AG, Schweinfurt, Fed. Rep. of Germany

[21] Appl. No.: 406,059

[22] Filed: Aug. 6, 1982

[30] Foreign Application Priority Data

Aug. 13, 1981 [DE] Fed. Rep. of Germany ....... 3132045

[51] Int. Cl.³ .............................................. F16D 3/14
[52] U.S. Cl. .............................. 192/106.2; 192/103 R; 192/106.1
[58] Field of Search ............ 192/106.2, 70.17, 103 R, 192/106.1, 105 BB; 464/1, 63, 68

[56] References Cited

U.S. PATENT DOCUMENTS

| 3,101,600 | 8/1963 | Stromberg | 192/106.2 X |
| 3,414,101 | 12/1968 | Binder et al. | 464/68 X |
| 3,534,841 | 10/1970 | Schneider et al. | 464/68 X |

FOREIGN PATENT DOCUMENTS

| 2950146 | 6/1981 | Fed. Rep. of Germany . | |
| 2040398 | 8/1980 | United Kingdom | 192/106.2 |
| 2044397 | 10/1980 | United Kingdom . | |
| 2044396 | 10/1980 | United Kingdom . | |
| 2050568 | 1/1981 | United Kingdom . | |
| 2056019 | 3/1981 | United Kingdom | 192/106.1 |

Primary Examiner—Rodney H. Bonck
Attorney, Agent, or Firm—Toren, McGeady, Stanger

[57] ABSTRACT

A torque transmission device particularly for a clutch disc unit to be used in a clutch assembly of an internal combustion engine comprises a hub member rotatable about an axis and a torque input member mounted on the hub member for angular movement with respect to the hub member about the axis of the hub member. A main damping unit and an idling damping unit are arranged for torque transmission from the torque input member to the hub member. A main damper input unit of the main damping unit is connected to the torque input member. A main damper output unit of the main damping unit is connected to an idling damper input unit of the idling damper unit and an idling damper output unit of the idling damper unit is connected to the hub member. A centrifugal mass-controlled locking member is provided for selectively permitting or locking angular relative movement of the main damper output unit with respect to the hub member. The angular movement of the main damper output unit with respect to the hub member is limited by interengaging abutment members having an angular play with respect to each other. The centrifugal mass-controlled locking member cooperates with these abutment members so as to selectively permit or lock this play.

12 Claims, 3 Drawing Figures

TORQUE TRANSMISSION DEVICE

SUMMARY OF THE INVENTION

The present invention is directed to a torque transmission device particularly for a clutch disc unit to be used e.g. in a clutch assembly of an internal combustion engine.

Such a torque transmission device comprises a hub member rotatable about an axis. A torque input member is mounted on the hub member for angular movement with respect to the hub member about the axis of the hub member. A main damping unit and an idling damping unit are provided in torque transmitting arrangement between the torque input member and the hub member.

The main damping unit comprises a main damper input unit and a main damper output unit, both said input unit and said output unit being mounted on said hub member for angular movement about the axis of the hub member. First elastic support means are provided in torque transmitting arrangement between the main damper input unit and the main damper output unit. Moreover first frictional damping means are arranged for damping relative angular movement of the main damper input unit and the main damper output unit about the axis of the hub member.

The idling damper unit comprises an idling damper input unit and an idling damper output unit. The idling damper input unit is mounted on the hub member for angular movement with respect to the hub member about the axis thereof. Second elastic support means are provided in torque transmitting arrangement between the idling damper input unit and the idling damper output unit. Moreover second frictional damping means are provided for damping relative angular movement of the idling damper input unit and the idling damper output unit.

The main damper input unit is connected for common angular movement with the torque input member. The idling damper output unit is connected for common rotation with the hub member.

The idling damper input unit is connected for common angular movement with the main damper input unit or the main damper output unit.

Centrifugal mass-controlled locking means are provided for locking the angular movement of the main damper output unit with respect to the hub member.

The torque input member is e.g. represented by the friction linings of a clutch disc unit and the hub member is in torque transmitting engagement with an input shaft of a gear box of a motor vehicle drive unit. The idling damper unit is adapted to suppress noise which might occur during idling operation of the engine due to play between meshing gears of the gear box. The main damper unit is intended to eliminate shocks which might occur in the torque transmission between the engine and the gear box in drive condition.

A torque transmission device of the above-described type is known e.g. from German Offenlegungsschrift 29 50 146. This known torque transmission device is of a highly complicated design as far as the centrifugal mass-controlled locking means are concerned which are to lock the angular movement of the main damper output unit with respect to the hub member.

It is the object of this invention to provide a torque transmission device of more simple and less expensive design particularly as far as the centrifugal mass-controlled locking means are concerned.

In view of this and other objects angular movement limiting means are provided between the main damper output unit and the hub member and the centrifugal mass-controlled locking means cooperate with these angular movement limiting means such as to selectively allow or lock limited angular relative movement of said main damper output unit and said hub member in response to the velocity of rotation of the hub member.

According to a preferred embodiment of the invention the angular movement limiting means comprise first and second abutment members mounted for common angular movement with the hub member and having an angular distance about the axis of the hub member. A third abutment member is mounted for common angular movement with the main damper output unit. This third abutment member is positioned angularly between the first and the second abutment members and has an angular extent smaller than the angular distance of the first and second abutment members. The centrifugal mass-controlled locking means comprise a locking member for engagement between the third abutment member and one of the first and second abutment members. The locking member has an angular extent substantially corresponding to the difference between the angular distance of the first and second abutment members on the one hand and the angular extent of the third abutment member on the other hand. The locking member is spring-biased towards a disengagement position radially offset with respect to said abutment members and is movable by centrifugal force into a locking position between the third abutment member on the one hand and one of said first and second abutment members.

The various features of novelty which characterize the invention are pointed out with particularity in the claims annexed to and forming a part of this disclosure. For a better understanding of the invention its operating advantages and specific objects attained by its use reference should be had to the accompanying drawings and descriptive matter in which there is illustrated and described a preferred embodiment of the invention.

Figure 1:
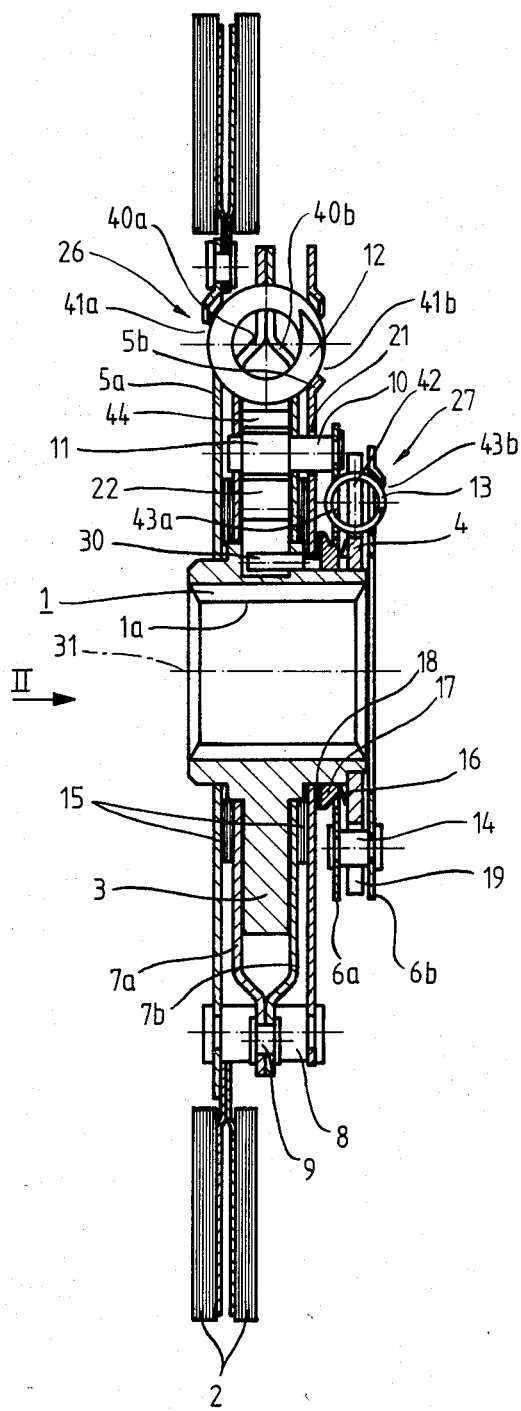
FIG. 1 shows a sectional view of a hub disc unit comprising a torque transmission device of this invention, the plane of section containing the axis of the hub member.
Figure 3:
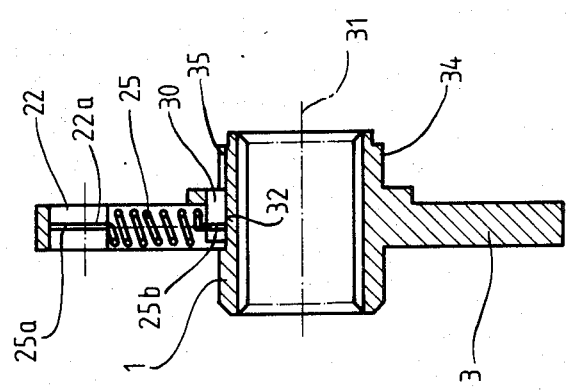
FIG. 3 shows a diagrammatic section according to line III—III of FIG. 2.

In the Figures a hub member is designated by 1. This hub member is provided with internal splines 1a for engagement with complementary splines of an input shaft of a gear box. The hub member 1 is provided with a hub disc 3 which is integral with the hub member 1.

The main damping unit is generally designated by 26 and the idling damper unit is generally designated by 27.

The main damping unit 26 comprises main damper output discs 7a and 7b provided adjacent respective side faces of the disc member 3. The main damper output discs 7a and 7b are interconnected by rivets 9 and are mounted for angular movement on the hub member 1.

First and second main damper input discs 5a and 5b are also mounted for angular movement on the hub member 1. The main damper input disc 5a is adjacent the main damper output disc 7a and the main damper input disc 5b is adjacent the main damper output disc 7b. The main damper input discs 5a and 5b are interconnected by bolts 8. The main damper input discs 5a and 5b are also mounted for angular movement on the hub member 1. Frictional linings 15 are provided between the first main damper input disc 5a and the first main damper output disc 7a and between the second main damper input disc 5b and the second main damper output disc 7b.

The main damper input discs 5a and 5b are provided with elongated circumferentially extending windows 41a and 41b and the main damper output discs 7a, 7b are provided with circumferentially extending elongated windows 40a and 40b. In the unloaded condition the windows 40a and 40b are in substantially axial alignment with the windows 41a and 41b. A helical compression spring 12 is housed within the windows 40a, 40b and 41a, 41b such as to define elastic support means in torque transmitting arrangement between the main damper input discs 5a, 5b and the main damper output discs 7a, 7b.

Friction pads 2 are fixed to the first main damper input disc 5a. These friction pads 2 may be regarded as the input member of the torque transmission device. They are intended for frictional engagement with a driving disc on the one side and a pressure ring on the other side of a usual clutch assembly of a motor vehicle.

The idling damper unit 27 comprises an idling damper output disc 4 fixed with respect to the hub member 1. On both sides of the idling damper output disc 4 there are provided first and second idling damper input discs 6a and 6b. These idling damper input discs 6a and 6b are interconnected by rivets 14. The rivets 14 pass through recesses 19 at the outer edge of the idling damper output disc 4. An elongated circumferentially extending window 42 is provided in the idling damper output disc 4. Moreover, elongated circumferentially extending windows 43a and 43b are provided in the idling damper input discs 6a and 6b respectively. The window 42 is in substantially axial alignment with the windows 43a and 43b in the unloaded condition of the hub disc. A helical compression spring 13 is housed within the windows 42; 43a, 43b so as to define elastic support means in torque transmitting arrangement between the idling damper input discs 6a, 6b on the one hand and the idling damper output disc 4 on the other hand. A pressure ring 17 is mounted on the hub member 1 for common rotation therewith but is movable in axial direction with respect to the hub member 1. A friction lining 18 is provided between the pressure ring 17 and the main damper input disc 5b. A cup spring 16 is interposed between the idling damper output disc 4 and the pressure ring 17 so that the friction lining 18 is under pressure between the pressure ring 17 and the main damper output disc 7b.

A torque transmitting bolt 10 (see also FIG. 2) passes through holes of the main damper output discs 7a and 7b and is provided with a section 11 of increased diameter which extends between the main damper output discs 7a and 7b so that the torque transmitting bolt 10 is fixed with respect to the main damper output discs 7a and 7b. The right-hand end of the torque transmission bolt 10 passes through a circumferentially extending elongated opening 21 of the main damper input disc 5b and is fixedly connected to the idling damper input disc 6a. As can be seen in more detail from FIG. 2, the section 11 of the torque transmitting bolt 10 passes through a slot 44 of the hub disc member 3 which slot is elongated in circumferential direction and comprises opposite terminal edge portions 23 and 24. As can be seen from the lower part of FIG. 2, the section 11 of the torque transmitting bolt has a circumferential play within the slot 44 at low rotational speed of the hub member 1.

The hub disc member 3 is further provided with a substantially radially extending guiding slot 28 which is defined by guiding edges 29a and 29b. The guiding edge 29b is a smooth continuation of the terminal edge portion 24 of the circumferentially extending slot 44. A locking member 22 of substantially cylindrical shape is radially guided within the guiding slot 28. The locking member 22 represents a centrifugal mass. A tensional spring 25 is connected by its radially outer end to the locking member 22 and by its radially inner end to the hub member 1 as indicated at 30 in FIG. 2. The locking member 22 is therefore radially biased towards its radially inner position as shown in the lower part of FIG. 2. As can be seen from FIG. 2, a plurality of torque transmitting bolts 10 are provided and a corresponding plurality of locking members 22.

Figure 2:
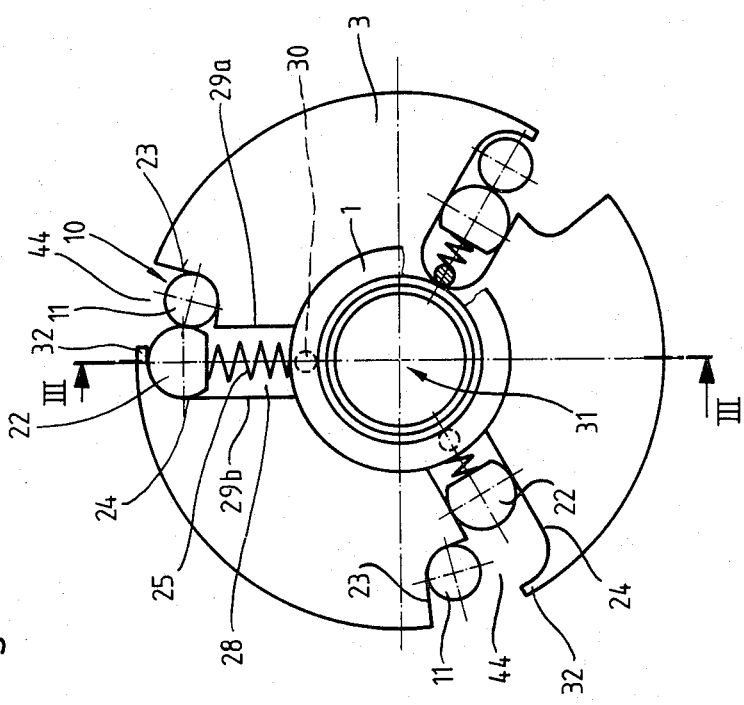
FIG. 2 shows in a diagrammatic representation a side view of the hub member with the hub disc, the angular movement limiting means and the centrifugal mass-controlled locking means according to arrow II of FIG. 1.

As can be seen from the upper part of FIG. 2, the circumferential distance of the end portions 23 and 24 corresponds to the sum of the circumferential extents of the section 11 and of the locking member 22. This means that in the radially outer position of the locking member 22, as shown in the upper part of FIG. 2, the torque transmitting bolt 10 is circumferentially fixed with respect to the hub disc member 3.

In idling operation of the engine, the locking members 22 are in their radially inward positions as shown in the lower part of FIG. 2. The helical compression spring or springs 12 are by far stiffer than the helical compression spring 13. The main damper input discs 5a and 5b and the main damper output discs 7a and 7b with the helical compression springs 12 therebetween can therefore be regarded as a rigid unit. This rigid unit is connected to the first idling damper input disc 6a by the torque transmitting bolt 10, the second idling damper input disc 6b being rigidly connected to the first idling damper input disc 6a by the bolts or rivets 14. When torsional vibrations occur the group comprising the main damper input discs 5a and 5b, the main damper output discs 7a, 7b, the helical compression springs 12, the friction linings 15, the torque transmitting bolt 10 and the idling damper input discs 6a, 6b as a rigid unit oscillates with respect to the hub member 1 and the idling damper output disc 4. These oscillations are permitted by the play of the section 11 of the torque transmitting bolt 10 within the circumferentially elongated slot 23 and are limited by the section 11 abutting the terminal edges 23, 24 of the slot 23. The helical compression spring 13 is compressed by such oscillations between the terminal edges of the window 42 on the one hand and the windows 43a, 43b on the other hand. The oscillations are damped by the friction pad 18 between the pressure ring 17 on the one hand and the main damper input disc 5b on the other hand, because the pressure ring 17 is rotationally fixed with respect to the hub member 1 and the main damper input disc 5b is part of the oscillating group.

When the rotational speed of the hub member 3 is increased the locking members 22 are moved radially outwardly, as shown in the upper part of FIG. 2, into an engagement position defined by an abutment nose 32. Now the section 11 of the torque transmitting bolt 10 is without play with respect to the hub disc member 3. The main damper output discs 7a, 7b are therefore now rotationally fixed with respect to the hub disc member 3. This means that the idling damper input discs 6a and 6b are also rotationally fixed with respect to the hub member 1. As the idling damper output disc 4 is also rotationally fixed with respect to the hub member 34, the idling damper unit 27 is locked or bridged.

When in this mode of operation oscillations occur the main damper input discs 5a and 5b can angularly move with respect to the main damper output discs 7a and 7b against the resistance of the helical compression spring or springs 12. The angular movement of the main damper input discs 5a, 5b with respect to the main damper output discs 7a, 7b is frictionally damped by the friction linings 15. The oscillational movement of the main damper input discs 5a, 5b with respect to the main damper output discs 7a, 7b is permitted by the bolt 10 passing through the circumferentially elongated hole 21 of the main damper input disc 5b.

As the idling damper 27 is locked or bridged in this mode of operation no angular play occurs when the direction of the torque to be transmitted is changed.

It is to be noted that the helical compression spring 13 is of such stiffness that in the idling operation the section 11 of the torque transmitting bolt 10 does not abut the terminal edges 23 and 24. When however the rotational speed of the hub member is increased above a value at which the centrifugal force on the locking member 22 exceeds the spring force of the tensional spring 25, the locking member 22 can enter between the terminal edge 24 and the section 11 of the torque transmitting bolt 10 on the first deflection of the torque transmitting member 11 with respect to the hub disc member 3 as shown in the upper part of FIG. 2.

It is further to be noted that the frictional torque created by the friction lining 18 between the pressure ring 17 and the main damper input disc 5b is small as compared with the frictional torque created by the friction linings 15 between the main damper input discs 5a, 5b and the main damper output discs 7a, 7b.

The axis of rotation of the hub member 1 is designated by 31.

The tensional spring 25 is connected to the locking member 22 by a hook 25a engaging a circumferential groove 22a of the locking member 22.

The inner end of the tensional spring 25 defines also a hook 25b which is in engagement with an axially extending pin 30. The axially extending pin 30 is pressed into a bore 32 of the hub disc member 25. This bore 32 is continued as a radially outward open groove 35 in the radially outer circumferential surface 34 of the hub member 1. The pressure ring 17 is provided with a radially inwardly directed tooth (not shown) which engages the groove 35 so as to fix the pressure ring 17 for common angular rotation with respect to the hub member 1.

The invention is not limited to the embodiment as illustrated. Modifications are possible without deviating from the basic principle of this invention. For example, it is possible that the main damper input discs 5a and 5b are connected to the idling damper input discs 6a and 6b.

Further, it is possible that instead of the section 11 abutting to abutment edges 24, 23 of the hub disc member 3 two abutment members are provided on the main damper output discs 7a and 7b and one cooperating abutment member is provided on the hub disc member 3, the locking member 22 engaging also in this case between these abutment members.

The reference numerals inserted in the following claims are only for a better understanding of these claims and by no means restrictive.

What is claimed is:

1. In a torque transmission device particularly for a clutch disc unit to be used in a clutch assembly of an internal combustion engine comprising:

a hub member rotatable about an axis;

a torque input member mounted on said hub member for angular movement with respect to said hub member about said axis;

a main damping unit and an idling damping unit both in torque transmitting arrangement between said torque input member and said hub member;

said main damping unit comprising a main damper input unit, a main damper output unit, both said input unit and said output unit being mounted on said hub member for angular movement about said axis, first elastic support means in torque transmitting arrangement between said main damper input unit and said main damper output unit, and first frictional damping means arranged for damping relative angular movement of said main damper input unit and said main damper output unit about said axis; said idling damper unit comprising an idling damper input unit being mounted on said hub member for angular movement about said axis, an idling damper output unit, second elastic support means in torque transmitting arrangement between said idling damper input unit and said idling damper output unit, and second frictional damping means arranged for damping relative angular movement of said idling damper input unit and said idling damper output unit;

said main damper input unit being connected for common angular movement with said torque input member;

said idling damper output unit being connected for common rotation with said hub member;

said idling damper input unit being connected for common angular movement with one of said main damper input unit and said main damper output unit;

centrifugal mass-controlled locking means being provided for locking the angular movement of said main damper output unit with respect to said hub member;

the improvement comprising:

angular movement limiting means being provided between said main damper output unit and said hub member such as to allow a limited angular relative movement of said main damper output unit and said hub member, said centrifugal mass-controlled locking means cooperating with said angular movement limiting means such as to selectively allow or lock said limited angular relative movement in response to the velocity of rotation of said hub member, said angular movement limiting means comprise first and second abutment members mounted for common angular movement with one of said hub member and said main damper output unit and having an angular distance about said axis, and a third abutment member mounted for common angular movement with the other of said hub member and said main damper output unit, said third abutment member being positioned angularly between said first and second abutment members and having an angular extent smaller than said angular distance of said first and second abutments members, said centrifugal mass-controlled locking means comprising a locking member for engagement between said third abutment member and one of said first and second abutment members, said locking member having an angular extent substantially corresponding to the difference between said angular distance of said first and second abutment members and said angular extent of said third abutment member, said locking member being spring-biased towards a disengagement position radially offset with respect to said abutment members and being movable by centrifugal force into a locking position between said third abutment member and said one of said first and second abutment members, said first and second abutment members are provided on a hub disc member mounted for common rotation with said hub member, and said locking member is substantially radially guided on said hub disc member.

2. A torque transmission device as set forth in claim 1, wherein said first and second abutment members are defined by circumferentially opposed terminal edge portions of a circumferentially elongated slot provided in said hub disc member, and said third abutment member extends axially into said slot.

3. A torque transmission device as set forth in claim 2, wherein said locking member is guided in a substantially radially extending guiding slot of said hub disc member.

4. A torque transmission device as set forth in claim 3, wherein said radially extending guiding slot comprises one guiding edge which is a continuation of one of said terminal edge portions of said circumferentially elongated slot.

5. A torque transmission device as set forth in claim 3, wherein said locking member is a cylinder member having an axis parallel to said axis of said hub member.

6. A torque transmission device as set forth in claim 3, wherein said third abutment member is defined by a section of a torque transmitting element connecting said main damper output unit with said idling damper input unit.

7. A torque transmission device as set forth in claim 6, wherein said main damper output unit comprises first and second interconnected main damper output discs adjacent first and second axially remote side faces of said hub disc member, respectively, and said main damper input unit comprises first and second interconnected main damper input discs adjacent said first and said second main damper output discs, respectively, said first elastic support means comprising at least one helical compression spring housed within a circumferentially extending axially aligned windows of said first and second main damper output discs and said first and second main damper input discs, said first frictional damping means being housed between at least one of said main damper input discs and the respective main damper output disc, and wherein the idling damper output unit comprises an idling damper output disc fixed with respect to said hub member and axially adjacent said second main damper output disc, and idling damper input unit comprises first and second idling damper input discs adjacent first and second axially remote side faces of said idling member output disc, said first idling damper input disc being positioned axially between said idling damper output disc and said second main damper output disc, said second elastic support means comprising at least one helical compression spring housed in circumferentially extending, axially aligned windows of said idling damper input discs and said idling damper output disc, at least one of said main damper output discs being connected with at least one of said idling damper input discs for common rotation therewith by said torque transmitting element acting as said third abutment member and extending into said circumferential slot of said hub disc member defining said first and second abutment members, said torque transmitting element passing through a circumferentially elongated opening of said second main damper input disc.

8. A torque transmission device as set forth in claim 7, wherein said locking member is axially positioned within said radially extending guide slot by said first and second main damper output discs.

9. A torque transmission device as set forth in claim 1, wherein said locking member is a centrifugal mass.

10. A torque transmission device as set forth in claim 9, wherein said locking member is spring-biased in radial direction by a tensional spring connected to said locking member by its one end and to said hub member by its other end.

11. A torque transmission device as set forth in claim 10, wherein said other end of said tensional spring is connected to a substantially axially extending pin fixed in a substantially axially extending bore of said hub disc, said bore of said hub disc being continued as a radially outwardly open groove of a radially outer surface of said hub member, at least part of said second frictional damping means being mounted on said radially outer face and engaging said groove.

12. In a torque transmission device particularly for a clutch disc unit to be used in a clutch assembly of an internal combustion engine comprising:
a hub member rotatable about an axis;
a torque input member mounted on said hub member for angular movement with respect to said hub member about said axis;
a main damping unit and an idling damping unit both in torque transmitting arrangement between said torque input member and said hub member;
said main damping unit comprising a main damper input unit, a main damper output unit, both said input unit and said output unit, being mounted on said hub member for angular movement about said axis, first elastic support means in torque transmitting arrangement between said main damper input unit and said main damper output unit, and first frictional damping means arranged for damping relative angular movement of said main damper input unit and said main damper output unit about said axis; said idling damper unit comprising an idling damper input unit being mounted on said hub member for angular movement about said axis, an idling damper output unit, second elastic support means in torque transmitting arrangement between said idling damper input unit and said idling damper output unit, and second frictional damping means arranged for damping relative angular movement of said idling damper input unit and said idling damper output unit;
said main damper input unit being connected for common angular movement with said torque input member;

said idling damper output unit being connected for common rotation with said hub member;

said idling damper input unit being connected for common angular movement with one of said main damper input unit and said main damper output unit;

centrifugal mass-controlled locking means being provided for locking the angular movement of said main damper output unit with respect to said hub member;

the improvement comprising:

angular movement limiting means being provided between said main damper output unit and said hub member such as to allow a limited angular relative movement of said main damper output unit and said hub member, said centrifugal mass-controlled locking means cooperating with said angular movement limiting means such as to selectively allow or lock said limited angular relative movement in response to the velocity of rotation of said hub member, said angular movement limiting means comprise first and second abutment members mounted for common angular movement with one of said hub member and said main damper output unit and having an angular distance about said axis, and a third abutment member mounted for common angular movement with the other of said hub member and said main damper output unit, said third abutment member being positioned angularly between said first and second abutment members and having an angular extent smaller than said angular distance of said first and second abutment members, said centrifugal mass-controlled locking means comprising a locking member for engagement between said third abutment member and one of said first and second abutment members, said locking member having an angular extent substantially corresponding to the difference between said angular distance of said first and second abutment members and said angular extent of said third abutment member, said locking member being spring-biased towards a disengagement position radially offset with respect to said abutment members and being movable by centrifugal force into a locking position between said third abutment member and said one of said first and second abutment members, said first and second abutment members are provided on a hub disc member mounted for common rotation with said hub member, said locking member is a centrifugal mass, said locking member is spring-biased in radial direction by a tensional spring connected to said locking member by its one end and to said hub member by its other end, said other end of said tensional spring is connected to a substantially axially extending pin fixed in a substantially axially extending bore of said hub disc, said bore of said hub disc being continued as a radially outwardly open groove of a radially outer surface of said hub member, at least part of said second frictional damping means being mounted on said radially outer face and engaging said groove.

* * * * *